United States Patent [19]
Boughnou et al.

[11] 3,863,259
[45] Jan. 28, 1975

[54] HYBRID PHASE/AMPLITUDE MONOPULSE DIRECTION-FINDING RECEIVER

[75] Inventors: Thomas R. Boughnou, Richardson; Kenneth G. Buss, Dallas, both of Tex.; Charles E. Frey, Ridgecrest, Calif.

[73] Assignee: The United States of America as represented by the Secretary of the Navy, Washington, D.C.

[22] Filed: Dec. 14, 1973

[21] Appl. No.: 425,002

[52] U.S. Cl............................ 343/113 R, 343/16 M
[51] Int. Cl................................................ G01s 5/02
[58] Field of Search ............ 343/16 R, 16 M, 113 R

[56] References Cited
UNITED STATES PATENTS

| 2,995,750 | 8/1961 | Holcomb et al. | 343/16 M |
| 3,467,963 | 9/1969 | Popta | 343/16 M |
| 3,708,794 | 1/1973 | Popta | 343/16 M |

Primary Examiner—Maynard R. Wilbur
Assistant Examiner—T. M. Blum
Attorney, Agent, or Firm—R. S. Sciascia; Roy Miller

[57] ABSTRACT

A unique high-speed sequential lobing (monopulse) direction-finding receiver which processes signals contained in the sum and difference patterns of a multi-mode direction-finding antenna to determine azimuth and elevation to a target in space.

5 Claims, 5 Drawing Figures

//
3,863,259

HYBRID PHASE/AMPLITUDE MONOPULSE DIRECTION-FINDING RECEIVER

BACKGOUND OF THE INVENTION

1. Field of the Invention

The invention is concerned with a monopulse radar receiver system for determining target angular coordinates, i.e. azimuth and elevation.

2. Description of the Prior Art

U.S. Pat. No. 2,995,750 to Holcomb et al, exemplifies the prior art as relates to monopulse radar receiver direction-finding systems. As stated in Holcomb et al, target angular coordinates have been derived by combining the output signals of four horns of a nonrotating monopulse antenna into signal combinations such as sum and difference signals and heterodyning these input signals to an intermediate frequency. Three or four input signals may be utilized with three or four separate channels and IF amplifiers to amplify and pass the input signals separately through the receiver. The IF input signals are detected and processed to obtain a measure of the relative amplitude of the signals received by the antenna and therefore, a measure of angular displacement of the antenna axis from the line of sight to the source of signals, that is, the target. That is to say, one is concerned with the angle off boresight of the antenna to the emitting target.

SUMMARY OF THE INVENTION

The present invention relates to a unique high-speed sequential lobing (monopulse) direction-finding receiver. The receiver and associated method are based on processing signals contained in the sum and difference (Mode 1 and Mode 2) patterns of a multimode DF antenna. The attractive aspects of the system, when compared to more conventional monopulse direction-finding receivers, are excellent boresight stability characteristics and virtual elimination of component tracking requirements. The excellent boresight stability can be attributed to the characteristics of the sum and difference of Mode 1 and Mode 2 patterns. When these patterns are used for the signal processing, boresight is determined by the location of the null of the difference pattern and is not dependent on the amplitude and phase relationship of the patterns as are pure amplitude and pure phase DF concepts. The double frequency conversion technique with DF phase information contained in one signal permits the use of a common channel to process all DF information (for both planes). The only RF components in the receiver which are not a part of a common channel are the pair of mixers used for the first signal conversion. These components do not require phase or amplitude matching for boresight accuracy; however, phase imbalance does result in plane rotation, and amplitude variation results in a change in slope of the angle transfer curves.

DESCRIPTION OF THE PREFERRED EMBODIMENT

Figure 1:
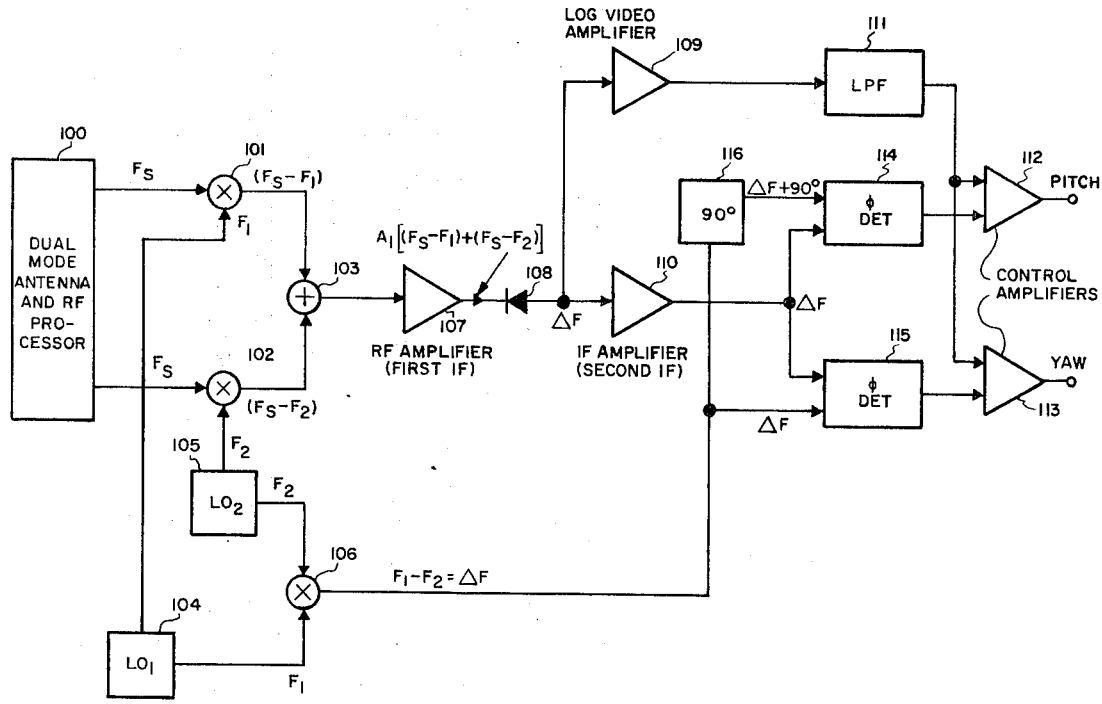
FIG. 1 is a functional block diagram of the present invention.

FIG. 1 is a functional block diagram for a hybrid phase/amplitude direction-finding system of the present invention. In FIG. 1 block 100 illustrates the front end of the network incorporating a dual mode antenna and RF processor. The RF processor outputs signals corresponding to the sum ($\Sigma$) and difference ($\Delta$) modes to pair of mixers 101 and 102. For the purpose of the description, the sum and difference signals are set forth as having the same frequency $F_s$. The mixers output in turn signals $F_s$ 14 $F_1$ and $F_s - F_2$ to a summing network 103.

Mixer 101 also receives an input $F_1$ from a first local oscillator 104. Mixer 102 in turn receives an input $F_2$ from a local oscillator 105. The local oscillator outputs $F_1$ and $F_2$ are in turn inputted to a mixer 106 which provides an output $F_1 - F_2 = \Delta F$.

Summer 103 provides an output to a first IF amplifier 107 which in turn provides an output to a detector 108. The output of the detector, $\Delta F$, is coupled as an input to a log video amplifier 109 and an IF amplifier 110.

The output of the log video amplifier 109 is coupled to a low pass filter 111 and the output thereof coupled as inputs to a pair of control amplifiers 112 and 113.

The output of the IF amplifier 110 is coupled as an input to a pair of synchronous detectors 114 and 115. Synchronous detector 115 also has as one input the output of the mixer 106 corresponding to $\Delta F$ while another input to the synchronous detector 114 comprises $\Delta F$ phase shifted by 90° in a phase shifter 116.

The outputs of the amplifiers 112 and 113 correspond to pitch and yaw information respectively.

Figure 3:
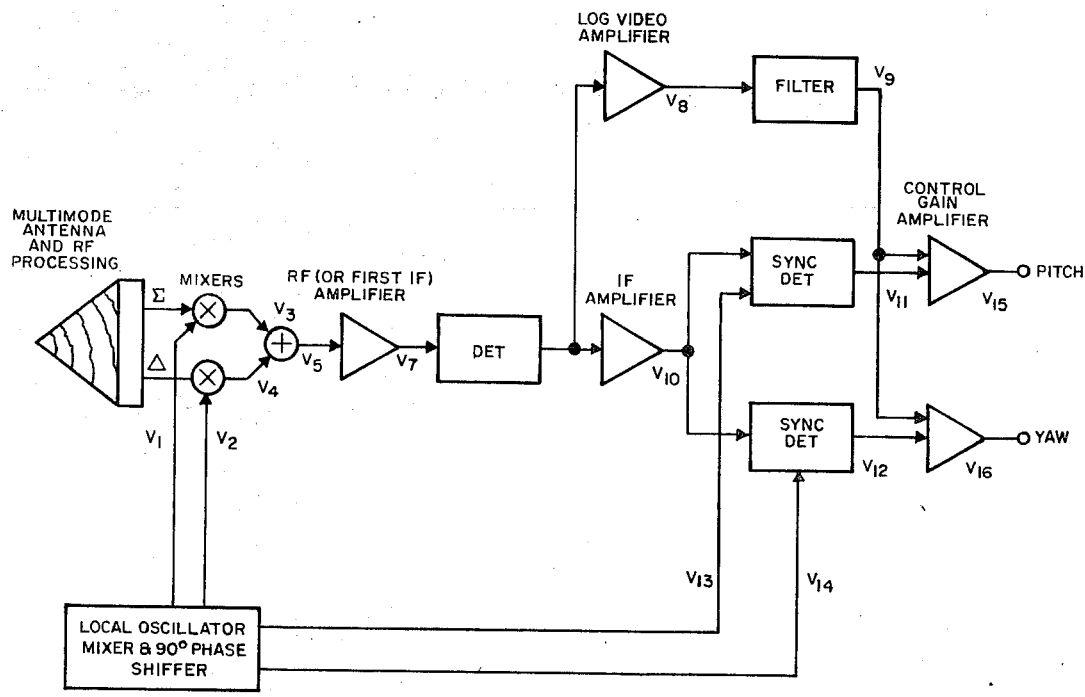
FIG. 3 is a block diagram of the present invention with characteristic voltages set forth.

FIG. 3 corresponds to FIG. 1 except that the local oscillators 104, 105, mixer 106 and phase shifter 116 have been combined into one block. Otherwise the block diagram and operation thereof corresponds exactly to that of FIG. 1 except on FIG. 3 representative voltages are set forth at various points in the diagram which correspond to the voltages of FIG. 5.

When the receiver concept is completely implemented, pitch and yaw guidance signals are extracted by retaining and operating on the phase and amplitude content of the signals appearing at the sum and difference ports. The sum and difference patterns are obtained by the far field excitation of the first and second modes of a planar spiral or equivalent antenna and RF processor 100. The two excited modes are then separated to form the sum and difference patterns by coupling the antenna feeds together through an appropriate network. The off-boresight response of the sum and difference patterns are assumed to approximate cosinusoidal and sinusoidal functions. This approximation contains the angular displacement information which is to be extracted.

In the block diagram representing the system function and shown in FIG. 1, the signals containing the angular displacement information are also separated from the received signal frequency by a first intermediate frequency and are also the input signals to a pair of mixers 101 and 102. The local oscillators 104 and 105 for the respective mixers are separated from the received signal frequency by a first intermediate frequency and are separated from one another by a second intermediate frequency. The difference frequency between the two local oscillators permits the selection of a convenient signal processing frequency and establishes a reference to which the signal phase can be compared.

After the first frequency conversions, the signals are added in an in-phase hybrid coupler 103. The signals are then amplified in a high center frequency, broadband, intermediate-frequency amplifier 107. The second frequency conversion occurs in a detector 108 located at the output port of the high center frequency IF amplifier 107.

This conversion results in a signal frequency equal to the difference frequency between the two local oscillators. By frequency converting a second time, the signal with its direction-finding information preserved is reduced to the same frequency difference that exists between the two local oscillators. At this point in the system, the signal is split for further processing along two paths. The path containing the log amplifier 109 and filter 111 is used to provide an instantaneous gain control input to a pair of pitch and yaw amplifiers 112 and 113 respectively. The second signal path at the detector output contains an IF amplifier 110 and a pair of synchronous phase detectors 114 and 115. The purpose of the IF amplifier 110 is to provide sufficient gain for the signal so that it will be at a suitable drive level at the input of the synchronous phase detectors 114 and 115 and to provide band narrowing for noise reduction. The signal is split at the IF amplifier output and appears in phase at the phase detector inputs. The difference signal from the LO's 104 and 105 is also split into two phase related reference signals, which drive the synchronous phase detectors 114 and 115. One of the reference signals drives its respective phase detector in quadrature.

Figure 2:
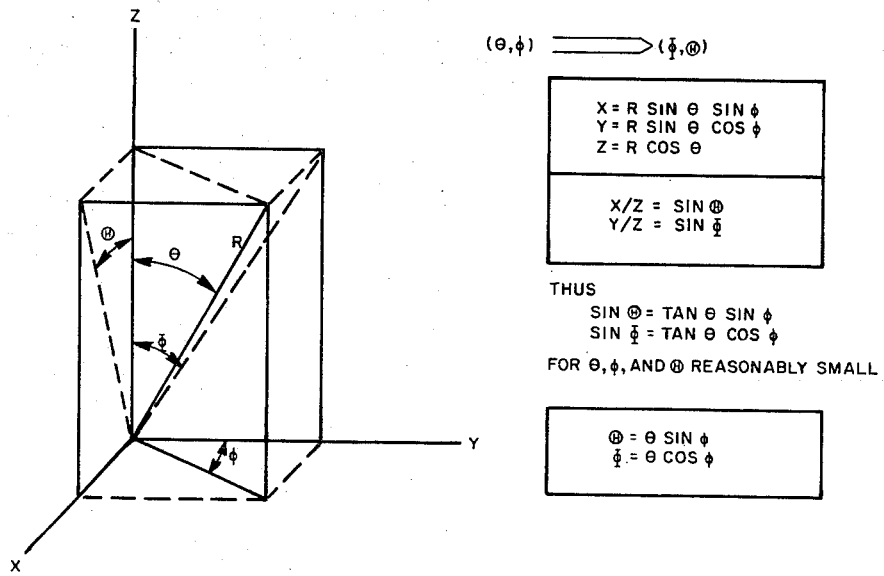
FIG. 2 is a graph of the coordinate transformation.

The synchronous phase detectors 114 and 115 are inherently phase sensitive; however, the circuits display an equally important amplitude sensitive characteristic. The importance of the amplitude sensitivity can be assessed by investigating the DF character of the signals. In the received sum and difference signals the phase and amplitude differences between the signals represent transformations of rotation and angular displacement, respectively (see FIG. 2). Since amplitude and phase relationship are preserved during two frequency conversions, they will also be present at the phase detector inputs. By operating on both amplitude and phase, the resultant output of the synchronous phase detectors will be signals that are proportional to the desired pitch and yaw guidance information. Intensity normalized amplifiers 112 and 113 then amplify the guidance signals to levels sufficient for driving detection, discrimination, and control circuits.

It is also interesting to note that a single voltage can be operated on to provide a circular angle gate centered about boresight. This voltage is $V_{10}$ of FIG. 3. It is also of interest to note that this concept is a novel approach to the conical scan DF system but offers advantages due to its monopulse operation.

In the receiver DF system, the signal processing philosophy is predicated on the operation of a dual-mode $\Sigma$ and $\Delta$ RF processor. First, the phase information contained in the mode patterns of the antenna must provide an adequate indication of the direction to the source of the received signal with respect to the roll axis of the antenna. Secondly, the angular displacement (absolute angle off boresight) must be proportional to the amplitude difference between the sum and difference patterns. In addition, boresight accuracy sensitivity, and linearity of the angle function about boresight is dependent on the depth and scale factor of the difference pattern null.

A mathematical analysis of the signal processing is presented to provide an understanding of the operation of the receiver. The coordinate transformation (FIG. 2) is included to clarify the transformation in the analysis. The graphical represntation of the signals shown in FIG. 4 for the frequency spectrum display and in FIG. 5 for a pulse modulated received signal are also presented to clarity the analysis.

Approximate Expressions for $\Sigma(t)$ and $\Delta(t)$ $$\Sigma(t) = E_T(t) \, K \, \Sigma(\theta) \cos[\omega t + \phi]$$
$$\Delta(t) = E_T(t) \, K \, \Delta(\theta) \cos[\omega t + 2\phi],$$

where $E_T(t)$ is a signal modulation function.

Functional Representation of $V_1$, $V_2$, $V_3$, $V_4$, and $V_5$ $$V_1(t) = \cos[(\omega + \omega_0)\,t + \psi_1],$$
$$V_2(t) = \cos[(\omega + \omega_0 + \Delta\omega)\,t + \psi_2],$$
$$V_3(t) = E_T(t)\, K\, K_\Sigma(\theta) \cos[\omega_0 t + \psi_1 - \phi],$$
$$V_4(t) = E_T(t)\, K\, K_\Delta(\theta) \cos[(\omega_0 + \Delta\omega)\,t + \psi_2 - 2\phi],$$
$$V_5(t) = E_T(t)\, K\{ K_\Sigma(\theta) \cos[\omega_0 t + \psi_1 - \phi] + K_\Delta(\theta) \cos[(\omega_0 + \Delta\omega)\,t + \psi_2 - 2\phi]\}.$$

Functional Representation of $V_6$, $V_7$, $V_8$, $V_9$, and $V_{10}$:

$$V_6(t) = G\, V_5(t)$$
$$V_7(t) = \overline{V_6^2(t)}$$

(The bar indicates only difference components are considered. The others are filtered out.)

$$V_7(t) = E_T^2(t)\{ \tfrac{1}{2} K_\Sigma^{\,2}(\theta) + \tfrac{1}{2} K_\Delta^{\,2}(\theta) + K_\Sigma(\theta) K_\Delta(\theta) \cos[\Delta\omega t + \phi - \psi_2 + \psi_1]\}.$$
$$V_8(t) = \log V_7(t),$$
$$V_9(t) = \log[\tfrac{1}{2} E_T^2(t)\, K_\Sigma^{\,2}(\theta)],$$
$$V_{10}(t) = E_T^2(t)\, K_\Sigma(\theta)\, K_\Delta(\theta) \cos(\Delta\omega t + \phi - \psi_1 + \psi_2).$$

Functional Representation of $V_{11}$, $V_{12}$, $V_{13}$, $V_{14}$, $V_{15}$, and $V_{16}$:

$$V_{11}(t) = \tfrac{1}{2} E_T^2(t)\, K_\Sigma(\theta)\, K_\Delta(\theta) \cos(\phi + \psi_1 - \psi_2 - \psi_3),$$
$$V_{12}(t) = \tfrac{1}{2} E_T^2(t)\, K_\Sigma(\theta)\, K_\Delta(\theta) \sin(\phi + \psi_1 - \psi_2 - \psi_3),$$
$$V_{13}(t) = \cos(\Delta\omega t + \psi_3),$$
$$V_{14}(t) = \cos(\Delta\omega t + \psi_3 + 90°),$$
$$V_{15}(t) = [K_\Delta(\theta)/K_\Sigma(\theta)] \cos(\phi + \psi),$$
$$V_{16}(t) = [K_\Delta(\theta)/K_\Sigma(\theta)] \sin(\phi + \psi),$$

where:

$$\psi = \psi_1 - \psi_2 - \psi_3.$$

If the antenna sum and difference patterns are assumed to approximate sine and cosine functions:

$$K_\Sigma(\theta) = K \cos\theta,$$
$$K_\Delta(\theta) = K \sin\theta,$$

Then:

$$V_{15} = K \sin\theta / K \cos\theta \, \cos(\phi + \psi)$$
$$V_{16} = K \sin\theta / K \cos\theta \, \sin(\phi + \psi).$$

For $\psi = 0$ $$V_{15} = \tan \theta \cos \phi,$$
$$V_{16} = \tan \theta \sin \phi,$$
$$\tan \theta = \theta + \theta^3/3 + (2/15) \theta^5 + (17/315) \theta^7 + ---,$$
$$\tan \theta \approx \theta \text{ for } 0° < \theta < 30°.$$

Therefore:

$$V_{15} = \theta \cos \phi \longleftrightarrow \Phi, \text{ Azimuth Angle,}$$
$$V_{16} = \theta \sin \phi \longleftrightarrow H, \text{ Pitch Angle.}$$

Figure 4:
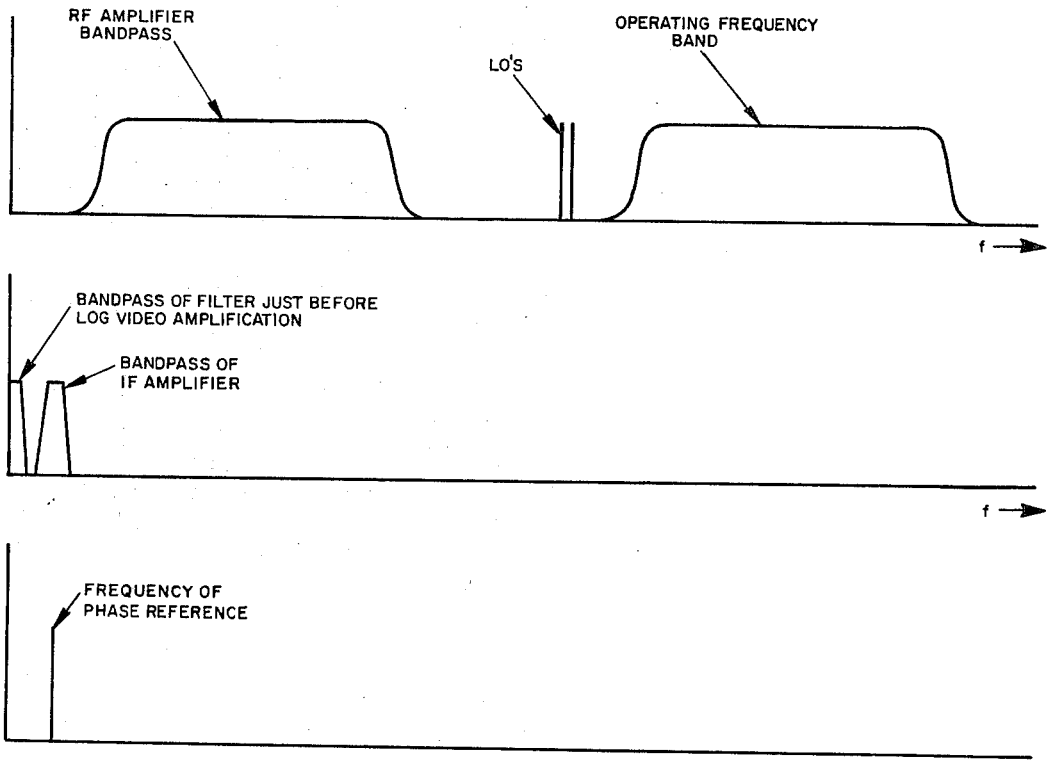
FIG. 4 is a graph of the frequency spectrum.
Figure 5:
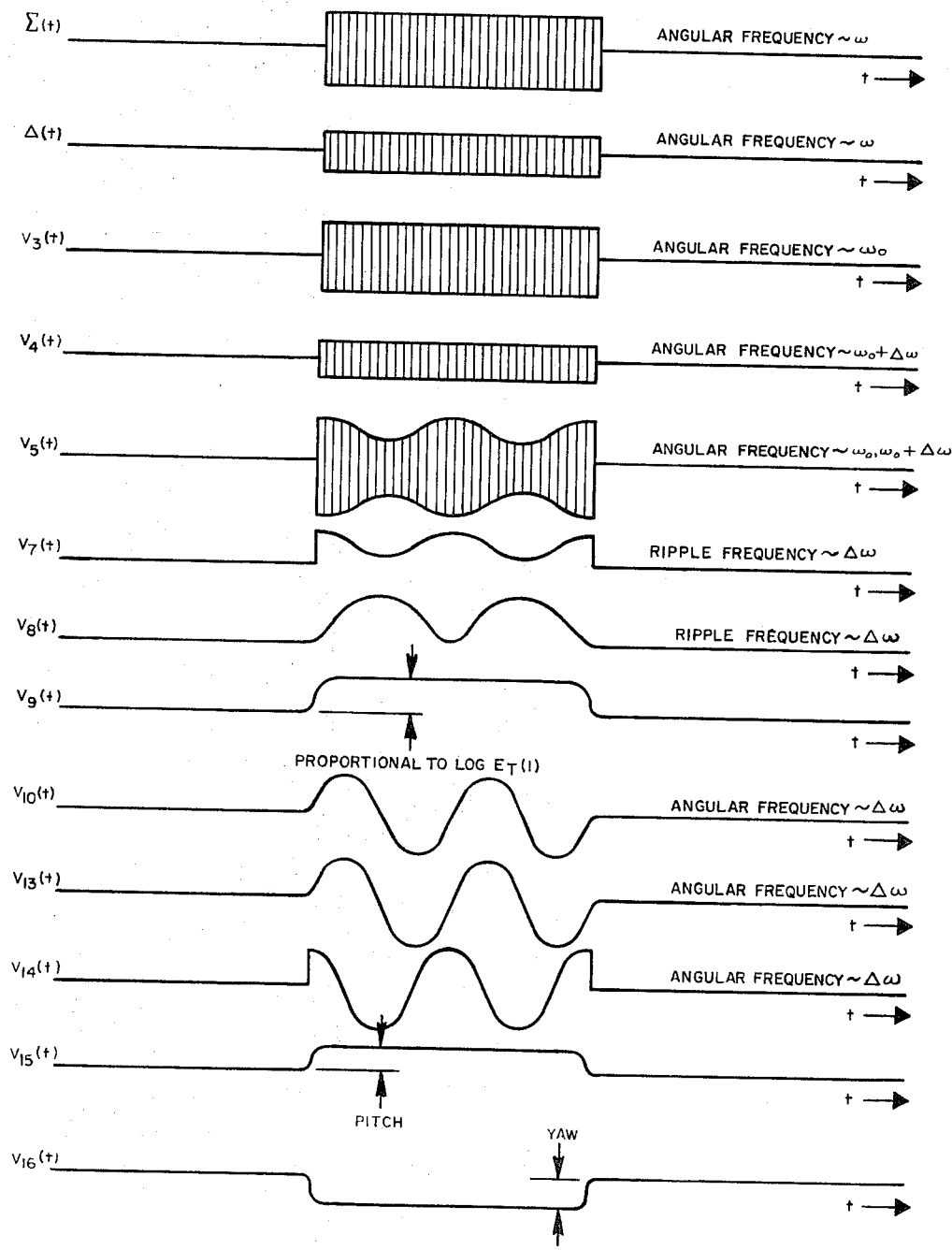
FIG. 5 is a graphical representation of the signals appearing on FIG. 3.

In addition to clarifying the analysis, the information contained in FIGS. 4 and 5 can assist in gaining a better understanding of the system. The frequency spectrum display of FIG. 4 gives an indication of the relative frequency distribution existing in the double frequency conversion process. The two frequency-separated LO's 104 and 105 are displaced in frequency from the input signal frequency band such that any resultant difference frequency between the LO's and input signal will be reproduced within the bandpass of the RF (or first IF) amplifier 107. The second frequency conversion will result in a signal occurring in the second IF passband. The center frequency of the second IF passband is shown to exist at the line frequency of the phase reference signal, which is the difference frequency between the two LO's. The bandpass of the IF amplifier is sufficient to pass an IF signal of whatever bandwidth is being considered (i.e., it depends upon the pulsewidth).

The pulse modulation signals of FIG. 5 are referenced to particular signal path junctions in the block diagram of FIG. 3. The sum and difference input signals from the antenna and RF processing circuits are shown as $\Sigma(t)$ and $\Delta(t)$ at an angular frequency of $\omega$ and contain the basic phase and amplitude DF information. The signals are first converted to a pair of signals for further amplification and processing. The angular frequency of the $\Sigma(t)$ signal is converted to $\omega_0$, and that of $\Delta(t)$ becomes $\omega_0 + \Delta\omega$. In the mixing process, the input signals are reconstructed at $\omega_0$ and $\omega_0 + \Delta\omega$ as $V_3$ and $V_4$, and since amplitude and phase relationships are preserved, they can be operated on to extract the DF information.

As before, it is pointed out that boresight does not depend upon phase or amplitude matching. Since the signals contain a frequency offset of $\Delta\omega$, they can be summed together and processed in a common channel. The summed signal, which is the input to the RF (or first IF) amplifier 107, is shown as $V_5$; the modulation of the signal can be attributed to the $\Delta\omega$ angular frequency offset between the two signals. The signal is analogous to a signal received via an antenna lobe which is spinning about boresight in a conical fashion at a rate of $\Delta\omega$. For instance, a signal $\Sigma + \Delta$ is a lobe offset from boresight as is the signal $\Sigma + j\Delta$. The conversion and summing process is equivalent to a spinning antenna lobe as described above, thus similar to a conical scan DF system.

The detected signal is depicted as $V_7$ and contains the signal intensity and DF information. The intensity component is present in the magnitude of the detected signal and can be extracted as illustrated in FIG. 3.

Other methods for normalization are also possible. The amplitude and phase of the $\Delta\omega$ ripple on the detected signal contains the DF information. For instantaneous AGC the detected signal is compressed by a log video amplifier 109 ($V_8$) and then processed through a lowpass filter 111 to produce the IAGC signal $V_9$. The detected ripple is amplified in an IF amplifier 110 with a $\Delta\omega$ center frequency. The signal is split in-phase at the amplifier output to form the inputs ($V_{10}$) to a pair of synchronous phase detector circuits 114 and 115. Again, the amplitude and phase of the amplified signal contains the DF information. The reference inputs to the synchronous phase detector circuits 114 and 115 were obtained by mixing the outputs of the two LO's 104 and 105 to produce a $\Delta\omega$ difference signal. This difference signal is used to drive one of the synchronous phase detector circuits 115 as an in-phase reference signal ($V_{13}$). The second difference signal from the LO's is in quadrature with respect to the first and is used as the reference input ($V_{14}$) to the second synchronous phase detector circuit 114. In the synchronous phase detector circuits the input DF signal is compared to the respective reference signals on the basis of amplitude and phase to determine the resultant video control signal. When the detector outputs are processed through a pair of IAGC amplifiers 112 and 113, the intensity component can be removed, and the result is a pair of pitch ($V_{15}$) and yaw ($V_{16}$) signals that are proportional to DF error control signals.

It is interesting to note that at boresight $\Delta(t)$ is zero. Thus, there is no signal generated at frequency $\Delta\omega$ at the detector 108. This results in no signal into the phase detectors, and thus a zero output to provide a pure and highly accurate boresight indication.

What is claimed is:

1. A high-speed sequential lobing direction-finding receiver comprising;

input means adapted to receive signals corresponding to the $\Sigma$ mode and $\Delta$ mode from an RF processor and having a frequency $F_s$;

said signals having phase and amplitude content;

oscillator means having outputs $F_1$ and $F_2$ separated in frequency from each other and from $F_s$;

mixing means operatively receiving the signals corresponding to $F_s$, $F_1$ and $F_2$ and outputting signals corresponding to $F_s - F_1$ and $F_s - F_2$;

detector means operatively coupled to said mixing means and operative to output a signal corresponding in frequency to the difference $\Delta F$ between $F_1$ and $F_2$;

other detector means having inputs coupled to the output said detector means and other inputs coupled to the output of said oscillator means;

said other detector means comprising a pair of synchronous detectors; and

90° phase shifter means operatively coupled between said oscillator means and one of said pair of synchronous detector means for phase shifting the signal $\Delta F$ coupled from said oscillator means to one of said synchronous detector means;

said other detector means receiving signals corresponding to $\Delta F$ with amplitude and phase information thereon from said detector means and signals corresponding to $\Delta F$ only from said oscillator means and outputting signals corresponding to pitch and yaw.

2. A direction-finding receiver as set forth in claim 1 wherein; said oscillator means comprises a pair of oscillators; one of said pair outputting a frequency $F_2$.

3. A direction-finding receiver as set forth in claim 2 wherein; said mixing means comprises a pair of mixers.

4. A direction-finding receiver as set forth in claim 3 and further including;
summing operatively connected between said pair of mixing means and said detector means operative to sum the output of said pair of detector means.

5. A direction-finding receiver as set forth in claim 1 and further including;
amplifier means operatively coupled to the output of said pair of synchronous detectors and receiving the output therefrom;

automatic gain control circuit means operatively coupled between the output of said detector means and the input of said amplifier means;

said amplifer means receiving inputs from said control circuit to control the gain of said amplifier means.

* * * * *